United States Patent [19]

Seitz et al.

[11] 4,163,931
[45] Aug. 7, 1979

[54] ARMATURE WINDING MACHINE

[75] Inventors: David R. Seitz, Dayton; Mark T. Heaton, Springfield, both of Ohio

[73] Assignee: The Globe Tool and Engineering Company, Dayton, Ohio

[21] Appl. No.: 737,284

[22] Filed: Nov. 1, 1976

[51] Int. Cl.² ............................................. G05B 19/18
[52] U.S. Cl. .................................... 318/569; 318/599; 318/600; 318/601; 318/603
[58] Field of Search ............... 318/600, 601, 603, 567, 318/569, 570, 39, 599

[56] References Cited

U.S. PATENT DOCUMENTS

| | | | |
|---|---|---|---|
| 2,670,145 | 2/1954 | Biddison | 242/13 |
| 3,013,737 | 12/1961 | Moore | 242/13 |
| 3,371,483 | 3/1978 | Gray et al. | 60/53 |
| 3,713,209 | 1/1973 | Biddison | 29/597 |
| 3,892,366 | 7/1975 | Ott | 242/7.05 B |
| 3,931,555 | 1/1976 | Dohanich et al. | 318/314 |
| 3,974,432 | 8/1976 | Thompson | 318/569 |

Primary Examiner—J. V. Truhe
Assistant Examiner—Eugene S. Indyk
Attorney, Agent, or Firm—Dybvig & Dybvig

[57] ABSTRACT

An armature winding machine of the type having a flier for winding wire onto a core is driven by a servo system, including a direct current servo motor. The servo system is under the direction of a wind sequence control mechanism. To convert command signals from the wind sequence control mechanism to motor commands usable by the servo system and to prevent wire breakage, command signals issued from the wind sequence control mechanism are modified by motor interface control circuitry which includes acceleration, deceleration, speed select and direction control circuitry.

18 Claims, 4 Drawing Figures

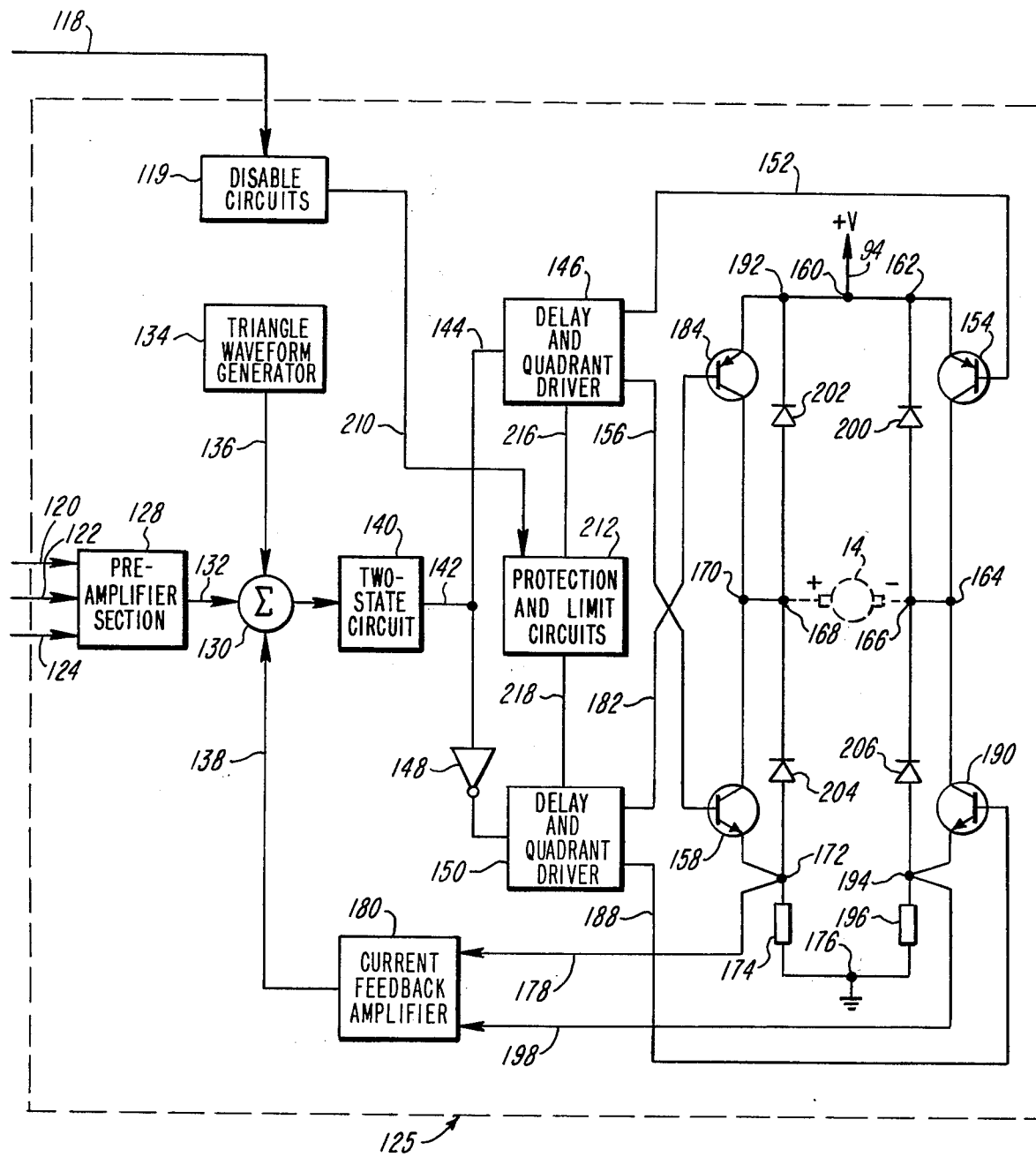
FIG-IB

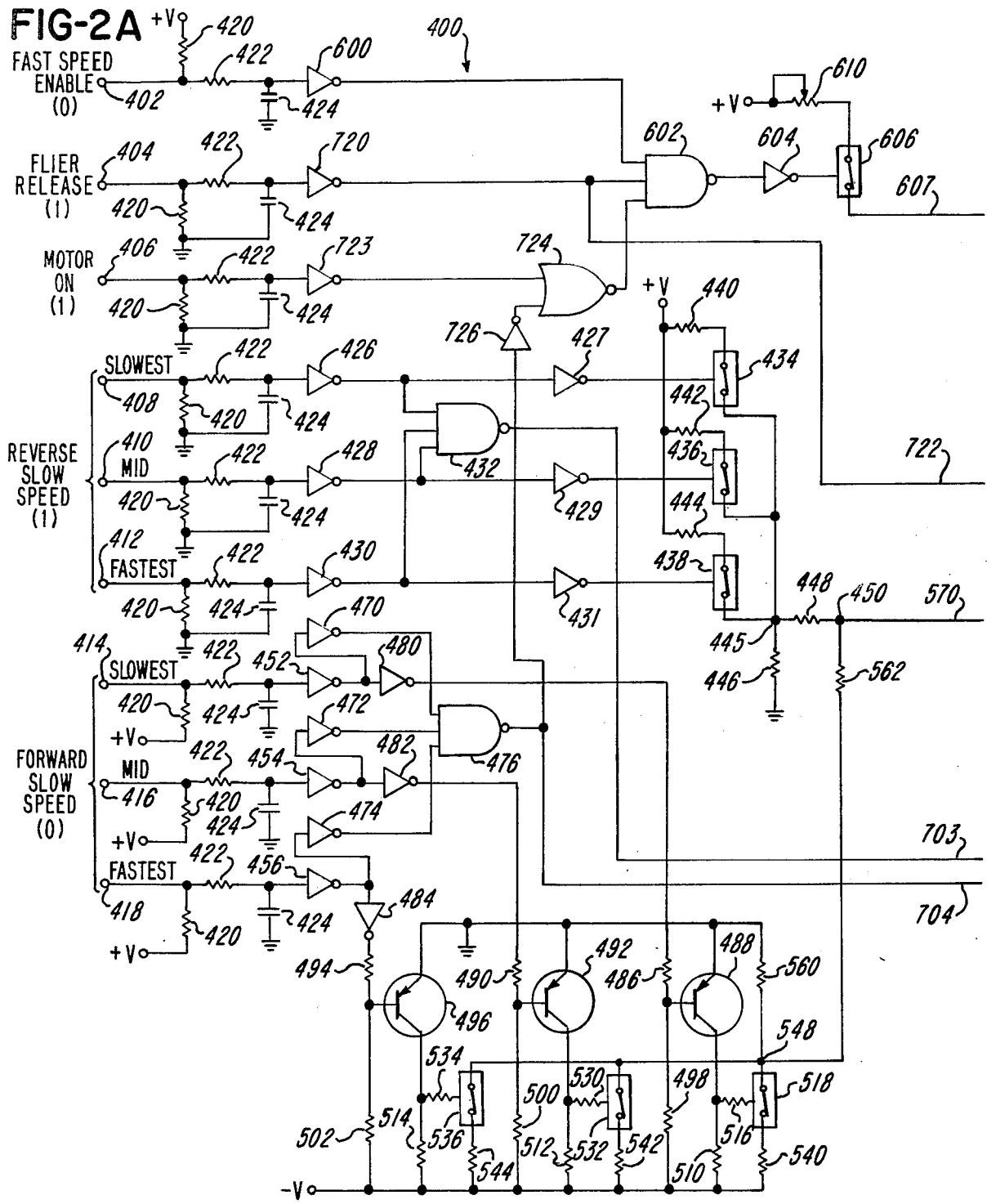

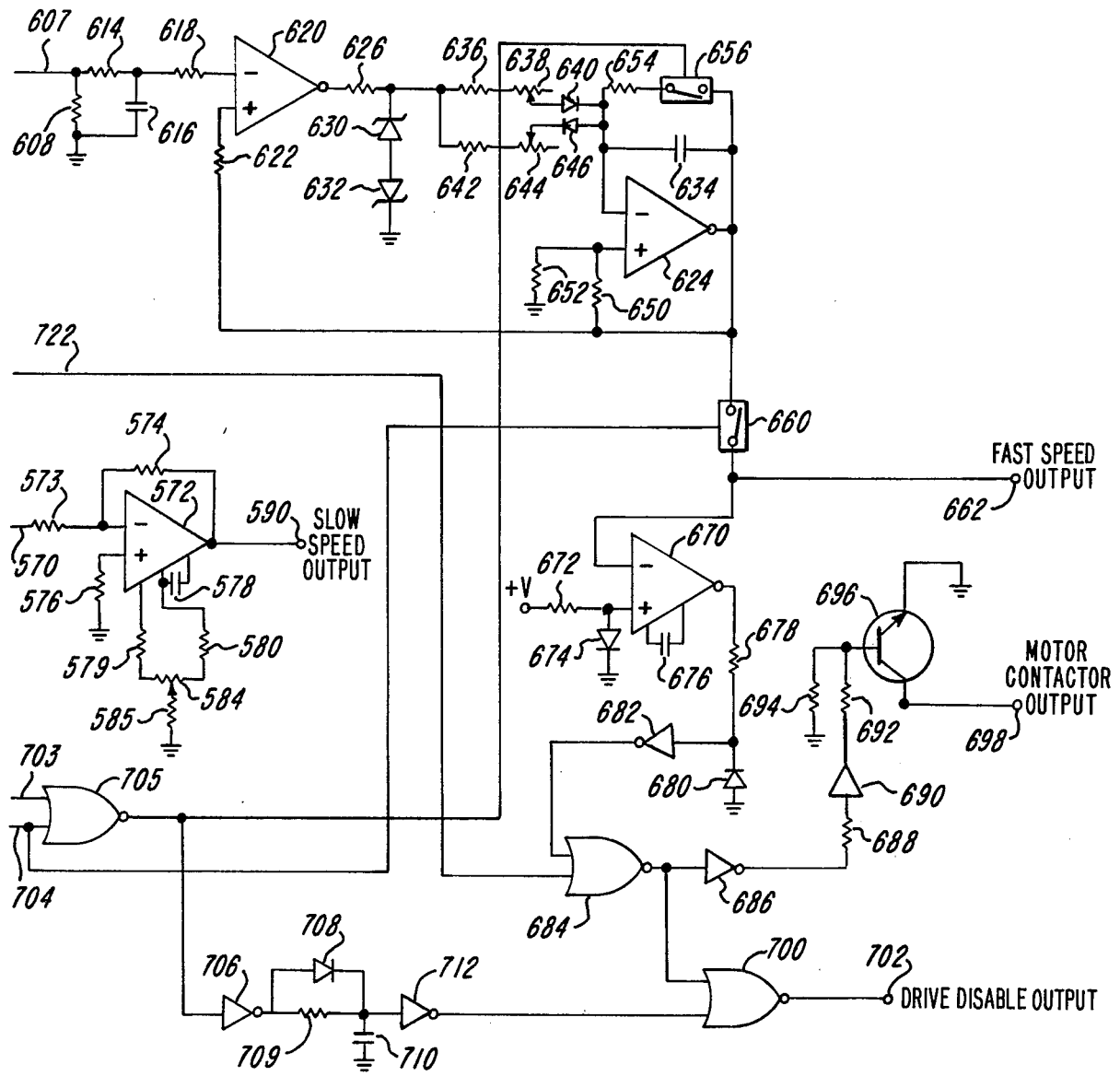

4,163,931

ARMATURE WINDING MACHINE

BACKGROUND OF THE INVENTION

This invention relates to armature winding machines and, in particular, to means for driving and controlling the movement of fliers in such machines.

Both electrically driven and hydraulically driven armature winding machines are known in the art. Prior electrically driven winding machines have presented the difficulty that the winding machine and its driving motor develop a considerable momentum, and such momentum has had to be absorbed by means of braking devices, which, due to friction associated with the braking function, are not capable of precise stopping functions at high speeds. Accordingly, electrically driven armature winding machines have had to be operated at low speeds to accomplish most winding operations, and their rate of production of wound armatures is correspondingly low.

Hydraulic armature winding machines have more recently been preferred in the art because it is easier with hydraulic controls to decelerate the operation of armature winding machines and, by appropriate control of machine deceleration, more accurately approach preferred flier stopping positions. However, it has still been the case that braking devices are required to establish desired winding positions. Thus, lower speeds are still required to obtain precise stopping, and wound armature production rates are also low. In addition, hydraulic machines are not generally suited for high speed operation because the necessary belting ratio changes for obtaining higher speeds often result in diminished flier torque for required operations at lower speeds. Multiple speeds to increase efficiency of the winding are not practical because of the expense and complexity of the required hydraulic parts.

In either electrically or hydraulically driven armature winding machines, problems have also been encountered in achieving control over the acceleration and deceleration of fliers from winding speeds. Overdamped and underdamped conditions frequently arise during machine operation because such control is not achieved, and such conditions have further diminished the productivity of the machines.

SUMMARY OF THE INVENTION

In the present invention, a servo system, including a high frequency switching mode operated servo controller and a direct current servo motor, causes rotation of an armature winding flier in accordance with a winding sequence program generated by a wind sequence control. Command signals issued by the wind sequence control are first modified to usable motor commands by motor interface control circuitry, which includes means to control the acceleration and the deceleration of the flier when commanded to operate at high speeds. The motor commands are delivered to the servo controller, where at a first summing junction a tachometer feedback signal indicative of motor velocity is compared to the motor command. The resultant error signal is then compared at a second summing junction with a feedback signal indicative of the current passing through the servo motor. The second summing junction provides a second error signal, which is combined with the output of a triangular waveform generator to produce switching mode signals which regulate the operation of the servo motor. In the illustrated embodiment, the signals are pulse width and frequency modulated to enhance the efficiency of the servo system.

A winding machine in accordance with the present invention winds armatures at a rate much increased over that of prior machines. Flier stoppage is accomplished through regenerative braking, which provides stopping in much shorter periods and with increased precision. In addition, numerous operating voltages enabling the completion of diverse flier movements at diverse speeds and in shorter time intervals are provided.

Shifts of motor operation to and from maximum speed are regulated by motor interface control circuitry, which provides greater control over such shifts and also operates to hold acceleration and deceleration forces within acceptable ranges so as not to damage the wire being wound. Because flier stoppage is accomplished through regenerative feedback, the consequent precision in flier stoppage results in a need for mechanical brake means during machine operation only to maintain flier positions against drift after stopping.

It is therefore an object of the present invention to provide an armature winding machine in which precise armature stopping positions are obtained at high speeds.

Another object of the present invention is to provide an electrically driven armature winding machine capable of stopping the winding flier at precise angular positions entirely through regenerative feedback.

It is a further object of the present invention to provide an armature winding machine having a direct current drive supplied by a servo system having high frequency switching mode operated motor drive circuitry.

A further object of the present invention is to provide voltage ramp acceleration and deceleration circuitry, the voltage ramps sloped to provide a controlled acceleration which will not be damaging to the wire being wound and a controlled deceleration which will enable precise stoppage of armature movements.

A still further object of the present invention is to provide circuitry for converting digital command signals to motor commands usable by the servo system.

Other objects and advantages will become apparent from the following description and the drawings.

BRIEF DESCRIPTION OF THE DRAWINGS

FIGS. 1A and 1B taken collectively comprise a schematic illustration of the operating components of an armature winding machine and associated servo system for moving the fliers of the winding machine, in accordance with the present invention.

FIGS. 2A and 2B taken collectively comprise a schematic illustration of motor interface control circuitry for use in the machine of FIGS. 1A and 1B.

DESCRIPTION OF THE PREFERRED EMBODIMENT

Figure 1A:
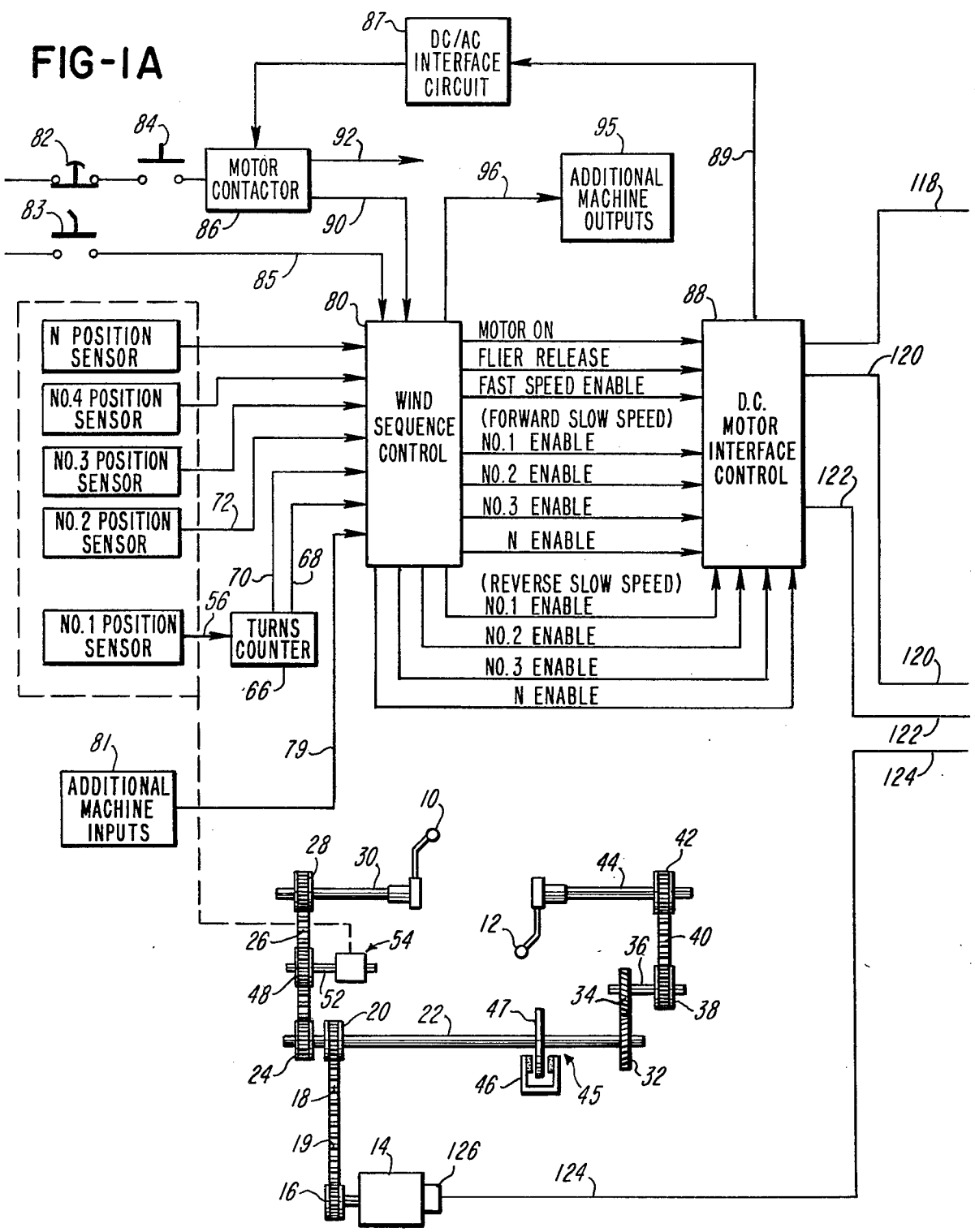

FIGS. 1A and 1B illustrate an armature winder and associated control circuitry for controlling the movements of armature winding fliers 10 and 12. The motive force which rotates the fliers 10 and 12 is supplied by a direct current servo motor 14, whose characteristics will be rendered apparent as this description progresses.

The energy output of the motor 14 is applied to a pulley 16 which drivingly engages a timing belt 18 having teeth 19 which assure a positive drive connection between the pulley 16 and the belt 18. The belt 18 engages and drives a pulley 20 affixed to a cross shaft 22.

A pulley 24 also affixed to the cross shaft 22 so as to rotate therewith drivingly engages a timing belt 26 which drivingly engages a pulley 28 splined to a spindle 30, which drivingly engages the flier 10.

For convenience, the flier 10 may be described as the left-hand flier, and the flier 12 as the right-hand flier. The right-hand flier 12 is caused to rotate in unison with the cross shaft 22 by means of a gear 32 cooperating with a reversing gear 34 affixed to a rotatable shaft 36. Also affixed to the shaft 36 is a driving pulley 38, which drivingly engages a timing belt 40 drivingly engaged to a pulley 42 splined to a spindle 44 drivingly engaged to the right-hand flier 12.

By reason of the driving connections between the motor 14 and the fliers 10 and 12, the two fliers rotate in opposite directions about the common axis of the spindles 30 and 44. As will be more fully explained in a later portion of this description, the servo motor 14, the fliers 10 and 12 and the driving connections therebetween are capable of being stopped without the need of a brake mechanism. However, a disc brake 45 comprising a caliper 46 and disc 47, the latter attached to the cross shaft 22, is utilized in the present invention to hold the armature winding machine against "drift" away from predetermined stopping positions.

The movements of the armature winder are monitored with the aid of a pulley 48 drivingly engaged to the timing belt 26. The pulley 48 is affixed to a shaft 52 associated with a position sensor mechanism illustrated generally at 54. The position sensor mechanism 54 comprises switches of a type known to those skilled in the art, having metallic elements rotated by the shaft 52 through orbits which bring the metallic elements into suitable positions for actuating proximity switch position sensors.

As schematically illustrated at the left center of FIG. 1A, the position sensors may be identified respectively as position sensor No. 1, No. 2, No. 3, No. 4 and N. Position sensor N is illustrated to indicate the generality of the position sensor mechanism, which may comprise an indefinite number of position sensors. The output of position sensor No. 1, which appears on line 56, is applied to a turns counter 66, which reports over a conductor 68 the 360 degree turns executed by the fliers 10 and 12. The conductor 68 connects to a wind sequence control 80. The turns counter 66 may also have preset slow-down signals, which are impressed upon a conductor 70 to initiate a winding speed reduction in the final turns of a winding sequence.

Position sensors No. 2, 3, 4, etc. are generally employed to indicate selected flier positions rather than complete turns, such as will be required between the winding of successive coils for accomplishing coil lead connections and for positioning the wire for entry into different armature slots. Those skilled in the art will appreciate, of course, that between the winding of successive armature coils other operations such as armature core rotation may take place to allow succeeding coils to be wound into different armature slots.

The output signals from the position sensors No. 2, 3, 4 and N are passed over respective conductors, such as conductor 72, to the wind sequence control 80. As illustrated, the wind sequence control 80 may also receive signals along a conductor 79 from additional machine inputs schematically illustrated as a box 81; and, inasmuch as FIGS. 1A and 1B are basically schematic, the conductor 79 may in actual practice comprise a large number of conductors whose function is to continuously advise the wind sequence control of the progress of the armature winding operation.

While not particularly illustrated in the present application, the wind sequence control operates in accordance with an internal program to initiate and verify completion of all operations required of the armature winder and in most cases many other operations required of peripheral equipment known to those skilled in the art.

In the upper left of FIG. 1A, there appear manual switches 82 and 84. The switch 82 is available to interrupt the winding sequence in progress, such as in the event of an emergency, by removing all electrical power and causing, by means not illustrated, engagement of the brake 45 to hold the fliers stationary. The switch 84 is a power supply enable. Assuming the switch 82 is not in a winding interrupt position, closure of the switch 84 will, for convenience, apply an AC power to a motor contactor 86, which completes conventional circuitry, not shown, to supply a signal to the wind sequence control 80 over a conductor 90 and to supply AC power over a conductor 92 to a positive power supply designated +V, which in turn provides a direct current motor operating voltage at a conductor 94 appearing in FIG. 1B.

At all times the operation of the motor contactor 86 is subject to the control of a signal which originates as a DC signal in a DC motor interface control schematically illustrated at 88. Such DC signal passes over a conductor 89 and through a DC/AC interface circuit 87, which converts the DC signal to an AC signal capable of enabling or disabling the motor contactor and, if disabling, removing the motor operating voltage at conductor 94.

Also shown is a flier release switch 83, which, upon manual closure, passes a signal over a conductor 85 to the wind sequence control 80. The wind sequence control is programmed upon receipt of such a signal to issue command signals to disable the servo motor 14 and the motor contactor 86 and keep the brake 45 disengaged so that the fliers are freewheeling and manually movable by the machine operator. If the fliers are operating at a high speed when the flier release switch 83 is closed, the motor interface control 88, by means which will be explained later, causes the fliers to first go through deceleration to a predetermined lower speed.

The wind sequence control 80 is shown as having a number of conductors for carrying command signals to the motor interface control 88. The conductors and the signals carried thereby are labeled in FIG. 1A and are as follows. There is a "motor on" signal when the DC motor is on, i.e., when the power is supplied to the DC motor by conductor 94 (FIG. 1B). There is a "flier release" signal, which notifies the motor interface control when there has been closure of flier release switch 83. The wind sequence control 80, in accordance with its own operating program, also renders signals to the motor interface control to cause any of a plurality of flier operating speeds. Thus, there is a "fast speed enable" and, for slow speeds, a "No. 1 enable," a "No. 2 enable" and a "No. 3 enable," all such command signals enabling flier movement in a forward winding direction. Similarly, for reverse direction slow speed winding, there are also a "No. 1 enable," a "No. 2 enable" and a "No. 3 enable." Again, to indicate the generality of the speed controls, there are shown also a forward slow speed "N enable" and a reverse slow speed "N enable," representing any number of additional forward or reverse slow speed command signals. However, in the present machine, there are needed for the desired efficiency only three forward and three reverse slow speeds; and only these six of the slow speeds will hereinafter be shown and described.

The wind sequence control also issues signals to additional machine outputs, schematically illustrated as a box 95, by way of a conductor 96, which in actual practice may represent any number of conductors carrying signals to cause machine or peripheral equipment operations other than those caused by the specifically labeled conductors.

The DC motor interface control 88 has four output conductors. One is a disable conductor 118, whose function is to terminate operation of the servo motor circuitry under certain circumstances, as will be apparent when the motor interface control is described in detail later. Two of the other outputs from the DC motor interface control comprise a fast forward winding speed conductor 120 and a slow speed conductor 122. The signals carried by conductors 120 and 122 will represent respective fast and slow speed motor commands after conversion by the motor interface control to an appropriate voltage level and polarity. One of the functions of the DC motor interface control is to guard against the appearance of a fast speed motor command except at times when the motor is already operating at slow speed in the appropriate direction. Inasmuch as the fast speed motor command is always a forward speed signal, it follows that the DC motor interface control will not permit a fast speed motor command to be carried by the conductor 120 to the servo controller until after the motor has been first placed into a slow speed operation in the forward direction.

The remaining output of the motor interface control 88 is carried by the conductor 89 to the DC/AC interface circuit 87 and from there to the motor contactor 86, which, upon the presence of an appropriate signal, removes the operating voltage from the DC motor as previously discussed.

The outputs of the DC motor interface control (excepting that carried by conductor 89) are all directed to a high frequency switching mode operated servo controller, generally designated 125, schematically illustrated in FIG. 1B enclosed by a broken line. As used herein, "high frequency" is intended to refer to switching frequencies in excess of 3000 Hz. Servo controllers satisfactory for use with this invention are commercially available. When combined with the servo motor 14 as shown in phantom in FIG. 1B, the servo controller 125 forms the servo system which will drive the armature winding machine of the present invention; and its operation will be briefly described hereinafter.

Any motor command appearing on the fast speed conductor 120 and/or the slow speed conductor 122 is summed with the signal appearing on the output conductor 124 of a tachometer 126, directly driven by the motor 14, in a preamplifier section 128 of the servo controller 125. By circuit design, the tachometer output signal on conductor 124 is always subtracted in the preamplifier section 128 from the sum of the possible fast speed and slow speed motor commands which reach the preamplifier 128. Thus, when the DC motor is driven in the forward direction, the tachometer output is of a polarity opposite to the fast speed motor command and the three forward slow speed motor commands. When the DC motor is driven in the reverse direction, the tachometer is also driven in the reverse direction and will output a signal to the conductor 124 which will be of opposite polarity as compared to the reverse slow speed motor commands.

The summation of slow and/or fast speed motor commands with the tachometer signal, after suitable amplification, is applied as a first error signal over a conductor 132 to a second servo summing junction 130 where such signal is summed with the output of a current feedback amplifier 180 brought to the summing junction on a conductor 138 to provide a second error signal. This second error signal is combined at the summing junction 130 with the output of a high frequency (in excess of 3000 Hz) triangular waveform generator 134 brought to the junction 130 on a conductor 136. The algebraic sum of the signals brought to the summing junction 130 is passed from that junction to a two-state circuit 140 to provide a square wave output signal on a conductor 142.

The two-state circuit 140 is in the nature of a Schmitt trigger. The signal received by the two-state circuit, except when driven to a nontriggering state by a second error signal exceeding the magnitude of the signal received from the triangular waveform generator 134, is a signal capable of switching the two-state circuit between respectively positive and negative states at a frequency determined by the magnitude of the signal from the triangular waveform generator in relation to the magnitude of the second generator in relation to the magnitude of the second error signal at the junction 130. Accordingly, except at levels of second error signals which overwhelm the signal received from the triangular waveform generator, the signal reaching the two-state circuit is a frequency modulated signal; and the output of the two-state circuit is in the nature of a pulse width and frequency modulated square wave signal. This pulse width and frequency modulation is a servo controller switching mode operation, which gives the servo system a high degree of responsiveness to motor commands from the motor interface control 88. Although servo controllers having other switching mode operations, such as pulse width modulation, could be utilized, pulse width and frequency modulation will, because capable of providing full DC signals when needed, give greater efficiency to the armature winding machine.

Positive signals on conductor 142 will be carried by a conductor 144 to periodically energize a quadrant drive 146, whose outputs applied over a conductor 152 to the base of a PNP transistor 154 and over a conductor 156 to the base of an NPN transistor 158 will cause the transistors 154 and 158 both to become conductive. The operating voltage appearing at the power supply +V and applied to the conductor 94 will accordingly cause a current to flow through circuit nodes 160 and 162 to the emitter of transistor 154 and through the collector of such transistor to a circuit node 164 and from there to a circuit node 166, the coil of the motor 14, a circuit node 168, a circuit node 170, the collector of transistor 158, the emitter of transistor 158, and thence to a circuit node 172. The DC current from circuit node 172 is sampled through a resistor 174 to ground and the resultant voltage applied over a conductor 178 to the aforementioned current feedback amplifier 180.

As indicated, the output of the two-state circuit 140 is alternately positive and negative. When the signal shifts to a negative voltage, the motor 14 is energized to operate in the reverse direction by signals transmitted by an inverter 148 to a quadrant driver 150, whose outputs are applied over a conductor 182 to the base of a PNP transistor 184 and also over a conductor 188 to the base of an NPN transistor 190. The transistors 184 and 190 thus rendered conductive permit the operating voltage applied at conductor 94 to cause a current through circuit nodes 160 and 192 to the emitter of transistor 184 and through the collector of such transistor to circuit node 170 from whence current will flow over circuit node 168 and through the coil of the motor 14 and circuit nodes 166 and 164 to the collector of transistor 190 and from the emitter of transistor 190 to a circuit node 194. From circuit node 194, the current is sampled through a resistor 196 and the resulting voltage applied over a conductor 198 to an input of the current feedback amplifier 180.

As well known to those skilled in the servo motor art, the motor 14 receives alternate positive and negative voltage signals, which induce alternate clockwise and counterclockwise impulses in the servo motor. Due to the aforementioned combined frequency and pulse width modulation, the resultant operation of the motor will be a net clockwise movement or a net counterclockwise movement except at times when the second error signal at the junction 130 is a net null signal. When the second error signal is not a net null signal, the signal input to the servo motor 14 generates whatever signal up to a full and continuous DC voltage input from the conductor 94 to either of the transistor pairs 184,190 or 154,158 to generate whatever tachometer feedback and current feedback signals are necessary to produce a second error signal at the summing junction 130, which tends toward a net null signal.

In this context, it will be understood that a net null second error signal produces a switching output from the two-state circuit 140 in which the positive and negative voltage signals are alternately supplied for equal times.

Any enabling signal appearing on conductor 118 is directed to a group of disable circuits enclosed in a schematic box 119 appearing in FIG. 1B. The disable circuits in box 119 generate signals over a conductor 210 to a group of protection and limit circuits enclosed in a box 212. The circuits in box 212 then generate disabling signals to the quadrant drivers 146 and 150, over respective conductors 216 and 218, such disabling signals preventing the quadrant drivers from delivering enabling signals to the transistors 154, 158, 184 and 190. When so disabled, the servo motor 14 is no longer responsive to motor commands from the motor interface control 88. Such a drive disable is used to eliminate flier position errors which might arise from "drift" due to slight currents at the motor interface control outputs when the fliers are to be at rest.

It is to be recognized that the motor 14 during the course of its operation, particularly during continued fast speed winding operation, necessarily causes the armature winding equipment to acquire a considerable momentum so that the armature winding apparatus seeks to continue its winding movements. One of the benefits of the present invention is the accomplishment of a stopping ability wherein the armature winding equipment, including the driving motor 14, can be stopped within approximately forty milliseconds or less without the aid of an auxiliary friction brake. In the accomplishment of such stoppage, the mass of the moving parts of the winding machine is reduced during manufacture as much as is feasible by the removal of unneeded metal; and the motor 14 is permitted to act as a generator with the electrical energy thereby generated returned to the voltage supply for the motor. Thus, a diode 200 connected between the circuit nodes 166 and 162 allows a voltage at the circuit node 166, if greater than the supply voltage at the circuit node 162, to be returned to the positive supply voltage by way of conductor 94. This circumstance would, of course, be accompanied by a voltage at the circuit node 168, which is negative with respect to ground, the result being that current will be drawn from ground through a diode 204 to the circuit node 168. In this fashion, the aggregate momentum or inertia of the motor 14 and the armature winding equipment driven thereby is permitted to generate electrical power, which is returned to the positive voltage source, such generation of power acting to rapidly absorb the momentum of the motor 14 and the associated winding apparatus.

In the event the motor 14 is required to be stopped when rotating in an opposite direction, diodes 206 and 202 cooperate to permit power to be returned to the positive voltage supply by way of conductor 94 as the motor 14 is quickly decelerated.

As mentioned earlier, the armature winding machine of the preferred embodiment will have seven selectable speeds, these being a forward fast speed, three forward slow speeds, and three reverse slow speeds. The forward fast speed is generally used in the actual winding of coil turns, since such winding can be done more quickly and does not involve the frequent stopping and starting which is characteristic of other phases of the winding operation. Those other phases of the winding operation are in most cases lead wire connection and other short stroke movements where slow speeds are required to allow the regenerative braking of the servo motor to stop such movements within their allotted stroke lengths. The use of the several slow speeds enhances the efficiency of the winding by permitting each of the various slow speed operations to be performed in the fastest acceptable speed. Combined with the high degree of precision afforded by the regenerative braking of the motor, the use of diverse speeds considerably reduces the amount of time taken to wind each armature.

FIGS. 2A and 2B illustrate a motor interface control circuitry, designated as a whole by the reference number 400, for use in the DC motor interface control 88 of FIG. 1A. The circuitry 400 has nine inputs: a "fast speed enable" input, designated 402; a "flier release" input, designated 404, a "motor on" input, designated 406; three "reverse slow speed" inputs, designated 408, 410 and 412; and three "forward slow speed" inputs, designated 414, 416 and 418.

The circuitry 400 inputs receive appropriate digital command signals from the wind sequence control 80 and convert these signals to diverse voltage level motor commands at the circuitry outputs usable by the servo controller 125. The circuitry will also generate one command to be transmitted to the DC/AC interface circuit 87.

The input 402, upon receipt of an appropriate signal from the conductor labeled "Fast Speed Enable" in FIG. 1A, will cause the fliers to wind in a presettable maximum fast forward speed. The inputs 408, 410 and 412, labeled in FIG. 2A as slowest, mid and fastest respectively, upon receipt of appropriate signals from the conductors labeled in FIG. 1A "Reverse Slow Speed," "No. 1," "No. 2" and "No. 3," will cause the winding to be carried out in the reverse direction and in respectively slowest, intermediate or fastest slow speeds. Input terminals 414, 416 and 418, also labeled in FIG. 2A as slowest, mid and fastest respectively, will, upon receipt of appropriate signals from the conductors labeled in FIG. 1A as "Forward Slow Speed," "No. 1," "No. 2" and "No. 3," cause the winding operation to be carried out in the forward direction at respectively slowest, intermediate or fastest slow speeds. The inputs 404 and 406 will generally prevent or remove the maximum fast speed motor command if the flier release switch 83 has been closed or if the DC motor is not connected to its power source.

Each of the nine inputs described above and shown in FIG. 2A is adapted to receive signals of either a "zero" or "one" logic level. Under the caption of each input is shown, in parentheses, the logic level which will place the input in what can be thought of as its "enabled" or "active" condition.

Each input is connected by a resistor, designated 420, to either ground or the positive voltage power supply +V. Each input is thereby tied to the logic level which will keep the input in an inactive or disabled condition. Accordingly, the fast speed enable input 402, which is enabled by a "zero" logic level, is connected to +V; the flier release input 404, which is enabled by a "one" logic level, is connected to ground; the motor on input 406, which is enabled by a "one" logic level, is connected to ground; the three slow speed reverse inputs 408, 410 and 412, which are enabled by a "one" logic level, are connected to ground; and the three forward slow speed inputs 414, 416 and 418, which are enabled by a "zero" logic level, are connected to the power supply +V. Also associated with each input is an RC filter for eliminating any electrical noise received at the input, comprised of a resistor 422 and a grounded capacitor 424.

Turning to the reverse slow speed inputs 408, 410 and 412, these inputs receive enabling command signals from the wind sequence control 80 and generate three DC motor commands of predetermined value at a slow speed output 590. That is, an enabling signal at the slowest speed input 408 will result in a relatively low DC voltage level at the output 590; an enabling signal at the mid speed input 410 will result in a larger DC voltage level at the output 590; and an enabling signal at the fastest speed input 412 will result in an even larger DC voltage level at the output 590.

Each of the inputs 408, 410 and 412 is connected to an inverter 426, 428 and 430 respectively. The output of each inverter 426, 428 and 430 is connected to an input of a NAND gate 432. In addition, the output of inverter 426 is connected to an inverter 427, the output of inverter 428 is connected to an inverter 429, and the output of inverter 430 is connected to an inverter 431. The outputs of inverters 427, 429 and 431 are connected separately to the control lead of transmission gates 434, 436 and 438 respectively.

As is known by those familiar with microcircuits, a transmission gate is a CMOS device which can be made to exhibit low resistance between its controlled or power terminals and act essentially as a closed switch when its control lead receives an appropriate voltage. The transmission gates 434, 436 and 438 have been selected to act as closed switches when the voltage at their control lead is at the "one" logic level and will act as an open switch when the voltage at their control lead is at a "zero" logic level.

One power terminal of transmission gate 434 is connected by way of a resistor 440 to the positive power supply +V. Likewise, one power terminal of transmission gate 436 is connected by way of a resistor 442 to +V, and one power terminal of transmission gate 438 is connected by way of a resistor 444 to +V. The other power terminals of the transmission gates 434, 436 and 438 are connected to a junction 445, which is connected to a junction 450 by way of a resistor 448. Junction 445 is also connected to ground by way of a resistor 446.

Turning now to the forward slow speed inputs, input 414 is connected to an inverter 452, input 416 is connected to an inverter 454, and input 418 is connected to an inverter 456. The outputs of inverters 452, 454 and 456 are connected to one input of a NAND gate 476 by way of respective inverters 470, 472 and 474, as shown. The output of inverter 452 is also connected to an inverter 480, the output of which is connected to the base of a PNP transistor 488 by way of a resistor 486. The output of inverter 454 is likewise connected to an inverter 482, the output of which is connected to the base of a PNP transistor 492 by way of a resistor 490. The output of inverter 456 is likewise connected to an inverter 484, the output of which is connected to the base of a PNP transistor 496 by way of a resistor 494. The bases of transistors 488, 492 and 496 are also connected to a negative power supply identified as −V by way of respective resistors 498, 500 and 502, as shown. The emitter of each of the transistors 488, 492 and 496 is connected to ground. The collector of transistor 488 is connected to the control lead of a transmission gate 518 by way of a resistor 516. The collector of transistor 492 is connected to the control lead of a transmission gate 532 by way of a resistor 530. Likewise, the collector of transistor 496 is connected to the control lead of a transmission gate 536 by way of a resistor 534. The transmission gates 518, 530 and 536 have been selected to act as closed switches when their control leads are at ground.

The collectors of the transistors 488, 492 and 496 are respectively connected to −V by way of resistors 510, 512 and 514. Transmission gate 518 is connected at one power terminal to −V by way of resistor 540. Transmission gate 532 is connected at one power terminal to −V by way of resistor 542. Transmission gate 536 is connected at one power terminal to −V by way of resistor 544. As will be explained in more detail later, the resistance values of the resistors 540, 542 and 544 associated with the forward slow speed inputs and the resistors 440, 442 and 444 associated with the reverse slow speed inputs will determine the voltage level appearing at slow speed output 590.

The other power terminal of each of the transmission gates 518, 532 and 536 is connected to a junction designated 548. Junction 548 is connected to ground by way of a resistor 560 and is also connected to previously mentioned junction 450 by way of a resistor 562.

As illustrated in FIGS. 2A and 2B, junction 450, which receives signals from both the reverse slow speed and forward slow speed inputs, is connected by conductor 570 and by way of resistor 573 to the inverting input of an operational amplifier 572. The noninverting input of operational amplifier 572 is connected to ground by way of a resistor 576. Operational amplifier 572 will invert the signal received from junction 450 and will also increase the current handling capability of the circuitry at output 590. Associated with operational amplifier 572 is a feedback loop having a resistor 574. Also associated with operational amplifier 572 are a compensation capacitor 578, which prevents amplifier instability due to temperature variations, and a resistance network comprising a resistor 579, a resistor 580 and a potentiometer 584 connected to ground by a resistor 585. The potentiometer 584 enables the offset to be adjusted to compensate for leakage current in the circuitry.

Turning now to the fast speed enable input 402, that input is connected to the input of an inverter 600. The inverter 600 is connected to one of three inputs of a NAND gate 602. The other two inputs of the NAND gate 602 receive signals originating from the flier release input 404, the motor on input 406 and the slow speed forward inputs 414, 416 and 418. The output of the NAND gate 602 is connected to an inverter 604, and the output of the inverter 604 is connected to the control lead of a transmission gate 606, which acts as a closed switch when the control lead receives a "one" logic level. One power terminal of the transmission gate 606 is connected by way of a potentiometer 610 to the positive power supply +V. As will be described in greater detail later, potentiometer 610 permits the maximum fast speed of the DC motor to be adjusted. The other power terminal of the transmission gate 606 is connected by a conductor 607 to the inverting input of an operational amplifier 620 by circuitry including a grounded resistor 608 (FIG. 2B) and an RC network comprising a first resistor 614, a grounded capacitor 616 and a second resistor 618. The RC network serves as a filter to eliminate electrical noise which may appear at the operational amplifier 620.

The operational amplifier 620 serves as a comparator, and its operation will be described in greater detail later. The noninverting input of the operational amplifier 620 is connected by way of a resistor 622 to the output of an operational amplifier 624. The output of the operational amplifier 620 is connected to a resistor 626. The output of resistor 626 is connected to ground by way of back-to-back zener diodes 630 and 632. As will be apparent to those skilled in the art, the diodes 630 and 632 serve to limit the voltage level of the output of operational amplifier 620.

The output of resistor 626 is also connected by way of two separate paths to the inverting input of the operational amplifier 624. One path from the resistor 626 to the operational amplifier 624 includes a resistor 636 and a potentiometer 638. The potentiometer 638 is connected to the inverting input of operational amplifier 624 by a diode 640, such that only positive current flowing in the direction from the potentiometer 638 to the operational amplifier 624 is permitted. In the second path from the resistor 626 to the inverting input of operational amplifier 624, there is similarly a resistor 642 and a potentiometer 644. The potentiometer 644 is connected to the inverting input by a diode 646 arranged oppositely to the diode 640, such that only positive current flowing in the direction from the operational amplifier to the potentiometer 644 is permitted.

The operational amplifier 624 is, as will be apparent to those skilled in the art, an integrater. A feedback loop having a capacitor 634 connects the inverting input of operational amplifier 624 to its output. The noninverting input of the operational amplifier 624 is connected to ground by way of a resistor 652 and is also connected to the output of operational amplifier 624 by way of a resistor 650. A resistor 654 and a transmission gate 656 are connected across capacitor 634; and when a "one" logic level is applied to the control lead of transmission gate 656, as will be described in greater detail later, the transmission gate 656 acts as a closed switch and the capacitor 634 discharges through the resistor 654.

The output of operational amplifier 624 is the voltage which when applied to the servo controller 125 will operate the DC servo motor and in turn the armature winding machine fliers, at the fast speed; and it is connected by way of a transmission gate 660 to the fast speed output 662.

The fast speed output 662, in addition to its connection to the servo controller 125 by conductor 120 as illustrated in FIG. 1B, is also connected to the inverting input of an operational amplifier 670. The noninverting input of the operational amplifier 670 is connected by way of a resistor 672 to the positive power supply +V and is also connected to ground by way of a diode 674. A compensation capacitor 676 is associated with the operational amplifier 670, as illustrated. The operational amplifier 670 serves as a comparator, and its output is connected to a resistor 678. The resistor 678 is connected to ground by way of a diode 680 and is also connected to the input of an inverter 682. The output of inverter 682 is connected to one of two inputs of a NOR gate 684. The other input of NOR gate 684 is connected to a conductor 722, which will be described in greater detail later. The output of the NOR gate 684 is connected to an inverter 686, which in turn is connected to a resistor 688. The resistor 688 is connected to a noninverting buffer 690. As is known to those skilled in the art, a noninverting buffer only serves to increase the current handling capability of the circuit. It will not affect the logic level present at its input. The buffer 690 is connected to the base of an NPN transistor 696 by way of a resistor 692. The base of transistor 696 is also connected to ground by way of a resistor 694. The emitter of transistor 696 is connected to ground, and the collector is connected to a motor contactor output 698. The motor contactor output 698 is, as illustrated in FIG. 1A, connected to the DC/AC interface circuit 87 by conductor 89. As has been described previously, this circuitry leads to the motor contactor 86 to connect or disconnect the DC motor from its operating voltage.

The output of NOR gate 684, in addition to its connection to inverter 686, is also connected to one of two inputs of a NOR gate 700. The output of the NOR gate 700 is connected to the drive disable output 702, which, as illustrated in FIG. 1B and as previously described, is connected to the disable circuit 119 by way of conductor 118. The second input of NOR gate 700 receives, as shown, signals originating in the circuitry associated with the reverse slow speed inputs 408, 410 and 412 and the forward slow speed inputs 414, 416 and 418. That is, the output of previously mentioned NAND gate 432 (FIG. 2A) is connected by way of a conductor 703 to one input of a NOR gate 705 shown in FIG. 2B. The output of the previously mentioned NAND gate 476 (FIG. 2A) is connected by conductor 704 to the other input of NOR gate 705. The conductor 704 is also connected to the control lead of previously mentioned transmission gate 660. The output of NOR gate 705 is connected to the control lead of previously mentioned transmission gate 656 and is also connected to an inverter 706. The output of inverter 706 is connected to a parallel connection of a diode 708 and a resistor 709, and the output of diode 708 and resistor 709 is connected to ground by a capacitor 710. The resistor 709 and capacitor 710 comprise an RC network, which will impose a delay on signals coming from the output of inverter 706. The diode 708, as will be described in greater detail later, results in a delay by the RC network only for "zero" logic level signals. The resistor 709 and diode 708 are also connected to the input of an inverter 712. The output of inverter 712 is connected to the second input of previously mentioned NOR gate 700.

Turning to the circuitry associated with the flier release input 404 and the motor on input 406 (FIG. 2A), input 404 is connected to an inverter 720. The output of inverter 720 is connected to the second of three inputs of previously mentioned NAND gate 602. The output of inverter 720 is also connected by the previously mentioned conductor 722 to the second input of previously mentioned NOR gate 684 (FIG. 2B). Motor on input 406 is connected to an inverter 723, the output of which is connected to one of two inputs of a NOR gate 724. The other input of NOR gate 724 is connected to the previously mentioned NAND gate 476 by way of an inverter 726. The output of NOR gate 724 is connected to the third input of previously mentioned NAND gate 602.

The operation of the motor interface control circuitry 400 will now be described. Assuming that the DC motor is on, i.e., connected by the motor contactor 86 to its power supply, but that winding has not yet started, each of the inputs to the circuitry excepting the motor on input 406 will be receiving a command signal which will render the inputs disabled or inactive. That is, the fast speed enable input 402 will be receiving a signal at a "one" logic level, the flier release input 404 will be receiving a signal at the "zero" logic level, the reverse slow speed inputs 408, 410 and 412 will be receiving a signal at the "zero" logic level, and the forward slow speed inputs 414, 416 and 418 will be receiving signals at a "one" logic level. The motor on input 406 will be enabled or active, receiving a signal at the "one" logic level.

When such is the case, there will be no motor command at the slow speed output. Looking at the reverse slow speed input 408, when a "zero" logic level is present, the output of inverter 426 will be at a "one" logic level, the output of inverter 427 will be at a "zero" logic level, and hence the transmission gate 434 will act as an open switch. Because the inputs 410 and 412 have similar components associated therewith, the transmission gates 436 and 438 will likewise be equivalent to open switches. The result will be no motor command at the slow speed output originating from the reverse slow speed inputs. The same result is true of the forward slow speed inputs 414, 416 and 418. Looking at input 414, when a "one" logic level is present, the output of inverter 452 is at a "zero" logic level. The output of inverter 480 is at a "one" logic level, which is transmitted to the base of transistor 488 by way of resistor 486 so that the transistor 488 is turned "off." With transistor 488 off, no current flows through resistor 510, and transmission gate 518 is equivalent to an open switch. Similarly, the "one" logic level at the inputs 416 and 418 results in the transistors 492 and 496 being off, and the transmission gates 532 and 536 are equivalent to open switches. As a result, the slow speed output 590 also does not receive any motor commands originating from the forward slow speed inputs.

When the reverse slow speed inputs are all at the "zero" logic level, as described above, all the inputs to the NAND gate 432 are at a "one" logic level; and thus the output of NAND gate 432 is at a "zero" logic level. This signal is transmitted to one input of the NOR gate 705 by way of conductor 703. Similarly, if all the forward slow speed inputs are at "one," as described above, all the inputs to the NAND gate 476 are at "one"; and the output of NAND gate 476 is also at "zero." The output of NAND gate 476 is transmitted by way of conductor 704 to the second input of NOR gate 705. Since both inputs of NOR gate 705 are at "zero," the output of NOR gate 705 is at "one." This "one" logic level signal is transmitted as shown to the transmission gate 656, which causes transmission gate 656 to act as a closed switch. When transmission gate 656 so acts, the capacitor 634, if previously charged, discharges through the transmission gate 656 and resistor 654. The significance of capacitor 634 so discharging will be discussed later.

The "zero" logic level signal transmitted by conductor 704 is also transmitted to the control lead of transmission gate 660, as shown. Transmission gate 660 will act as an open switch when its control lead voltage drops to "zero"; and since the transmission gate 660 connects the fast speed output 662 with the circuitry generating the fast speed motor command, the result is blockage of any signal originating in the fast speed enabling circuitry to the fast speed output 662.

When there are no slow speed forward enabling commands, the "zero" logic level of NAND gate 476 is also transmitted to inverter 726 where the signal is inverted to a "one" logic level and transmitted to one input of NOR gate 724. The "one" logic level signal from inverter 726 causes the output of NOR gate 724 to go to "zero," and the "zero" logic signal from NOR gate 724 is transmitted to one input of NAND gate 602. A "zero" logic signal of any input of a NAND gate 602 results in a "one" logic level at its input. The "one" logic level at the NAND gate 602 output is inverted to a "zero" logic level by inverter 604. The "zero" logic level at the output of inverter 604 is transmitted to the control lead of transmission gate 606, which is thereby caused to act as an open switch, and also prevents any enabling signal at the fast speed output 662.

It can thus be seen that the absence of enabling command signals at the forward slow speed inputs operates to prevent any fast speed motor command to the servo controller 125. The disabling of transmission gate 606 as described above prevents fast speed motor commands by cutting off the power supply +V from the fast speed signal generating circuitry. The disabling of transmission gate 660 prevents leakage currents generated in the fast speed signal generating circuitry from reaching the output 662 and inadvertently causing the DC motor 14 to operate.

The NAND gate 602 will also cause transmission gate 606 to act as an open switch when appropriate signals are present at the fast speed enable input 402, flier release input 404 and the motor on input 406. Assuming still that there are no enabling commands at the inputs to begin the winding operation, the fast speed enable input 402 will have a "one" logic level. This signal will be inverted by inverter 600 to a "zero" logic level and transmitted to one input of the NAND gate 602. The "zero" logic level at any input of NAND gate 602 will cause NAND gate 602 to have a "one" logic level at its output, which is inverted by inverter 604 to a "zero" logic level and transmitted to the control lead of transmission gate 606 to cause transmission gate 606 to act as an open circuit.

Likewise, if the flier release input 404 receives a "one" logic level enabling signal, the output of the inverter 720 will be at a "zero" logic level. The output of NAND gate 602 will be at a "one" logic level, which, when inverted to "zero" by inverter 604 and transmitted to the control lead of transmission gate 606, will make transmission gate 606 act as an open switch. The third input to NAND gate 602 receives, by way of NOR gate 724, a signal from the motor on input 406 and, as discussed previously, the slow speed forward inputs 414, 416 and 418. The NOR gate 724 will have a "zero" logic level at its output, which transmitted to NAND gate 602 will cause transmission gate 606 to act as an open switch when the forward slow speed inputs are all disabled, as discussed above, or when the motor on input 406 is at a "zero" logic level, indicating that the DC motor power supply has been disconnected from the DC motor 14.

If we now assume that an enabling command signal appears at one of the forward slow speed inputs, and if we further assume such signal appears at input 414, the output of the inverter 452 will go to a "one" logic level. The output of inverter 480 will be at a "zero" logic level, and that signal transmitted through resistor 486 to the base of transistor 488 will cause transistor 488 to conduct. Current will flow from ground through emitter to collector through resistor 510 to −V, and the resulting voltage at the collector of transistor 488 will be at ground, which will be applied to the control lead of transmission gate 518. Transmission gate 518 will be caused to act as a closed switch, and current will flow from ground through resistor 560, transmission gate 518 and resistor 540 to the −V power source.

The resistor 540 and the resistor 560 in parallel with the resistor combination of 562, 448, 446 and 573 will act as a voltage divider. That is, the greater the value of resistance of resistor 540, the more of the voltage drop across 540 and the less the voltage drop across 560 and the parallel combination. Resistor 540 is chosen as relatively large, and thus the voltage drop across 560 will be relatively small. Since resistor 560 connects ground to junction 548, the voltage drop across 560 can generally be thought of as the voltage at junction 548; and that voltage is transmitted to the operational amplifier 572 by way of resistors 562 and 573. It should be noted that this voltage is negative. The operational amplifier 572 inverts this signal to a positive voltage at the slow speed output 590 to operate the DC motor in the slowest of the three forward slow speeds.

The operation of the circuitry when enabling command signals are received at inputs 416 and 418 is identical. However, in each case a different voltage level appears at the junction 548. As discussed previously, these voltage levels are determined by the resistance values for resistors 540, 542 and 544. The resistance 542 is chosen somewhat smaller than the resistance 540, and thus a larger voltage will appear at junction 548 when a command signal is present at input 416. An even smaller resistance value is chosen for resistor 544, thus resulting in an even larger voltage appearing at junction 548 when a command signal is present at input 418.

Turning now to the slow speed reverse inputs 408, 410 and 412, when an enabling signal is received, for example, at input 408, the output of inverter 426 is at a "zero" logic level. The output of inverter 427 is thus at a "one" logic level, which is transmitted to the control lead of transmission gate 434. Transmission gate 434 thus acts as a closed switch, resulting in current flow from the positive voltage source +V through the resistor 440 through transmission gate 434 and through resistor 446 to ground. The resistor 440 and the resistor 446 in parallel with the resistor combination 448, 562, 560 and 573 also act as voltage dividers. That is, when the resistance 440 is made larger, the voltage drop across resistor 440 will become larger; and the voltage drop across resistor 446 and the parallel combination will become smaller. Because resistor 446 connects junction 445 to ground, the voltage drop across resistor 446 can be thought of as the voltage at junction 445. Because current is flowing from the positive voltage source through resistor 446 to ground, the voltage at junction 445 will be positive.

A positive voltage will also appear at junction 445 when the inputs 410 and 412 receive enabling signals. However, the resistance 442 is chosen somewhat smaller than the resistance 440, and as a result the voltage at junction 445 will be larger than the voltage arising from a command signal at input 408. Similarly, the resistance 444 is chosen even smaller, resulting in an even greater voltage appearing at junction 445 when a command signal is received at input 412. The voltage at junction 445 is transmitted to the operational amplifier 572 by way of resistors 448 and 573. Because the voltage at junction 445 is positive and is received at the operational amplifier 572 at its inverting input, the resulting motor command at the slow speed output 590 will be negative.

Turning now to the motor commands generated at the fast speed output 662, as previously mentioned, the fast speed output 662 will cause the fliers to accelerate to the maximum fast speed only when the transmission gate 606 acts as a closed switch. That is, there must be an enabling signal at the fast speed enable input 402, the flier release input must not be enabled, the motor on input must be enabled, and at least one of the forward slow speed inputs must receive an enabling command signal. When transmission gate 606 receives a "one" logic level signal, it acts as a closed switch; and the fliers will then go through their acceleration to their maximum fast speed. Current flows from the positive voltage source +V through the potentiometer 610 through conductor 607 and through resistor 608 to ground. As will be apparent to those skilled in the art, the potentiometer 610 and the resistor 608 act as a voltage divider. That is, when the resistance across potentiometer 610 is increased, the voltage drop across potentiometer 610 increases and the voltage drop across resistor 608 decreases. The voltage across resistor 608 determines the maximum voltage of the motor command which will appear at the fast speed output 662, and hence the maximum speed of the fliers when operating at fast speed is presettable by adjustment of potentiometer 610. The voltage across the resistor 608 is filtered as previously mentioned and is transmitted to the inverting input of operational amplifier 620. As previously mentioned, operational amplifier 620 is a comparator. It is designed such that when the voltage at the inverting input becomes greater than the voltage at the noninverting input, the output will become negative. When, on the other hand, the voltage at the inverting input becomes less than the voltage at the noninverting input, the output of the operational amplifier will become positive. The back-to-back zener diodes 630 and 632 limit the output voltage of operational amplifier 620. When transmission gate 606 first acts as a closed switch, the voltage at the inverting input will be greater than the voltage at the noninverting input; and the output of operational amplifier 620 will be negative. This negative signal travels a path through resistor 642 through the potentiometer 644 through the diode 646 to the inverting input of the operational amplifier 624. As previously mentioned, the operational amplifier 624 acts as an integrater; and the voltage appearing at the output of operational amplifier 624 will have the characteristics of an increasing positive linear ramp. By varying the resistance of potentiometer 644, the slope of that ramp may be adjusted; and thus the acceleration of the DC motor to its maximum fast speed may be controlled. As will be apparent to those skilled in the art, this simple means for controlling the acceleration of the DC motor and hence the armature winding fliers adds significant flexibility to the use of the armature winding machine. Since the different wire and wire sizes used in winding armatures tolerate varying maximum level strains and pulling forces from the fliers, the machine operator is permitted to readily change from one wire to another and provide for different characteristics by adjustment of the potentiometer 644.

The voltage at the output of operational amplifier 624 is fed back to the noninverting input of operational amplifier 620, and after a period of time the voltage at the inverting input of the operational amplifier 620 will become smaller than the voltage at the noninverting input of operational amplifier 620; and the output of operational amplifier 620 becomes positive. This positive signal travels from the operational amplifier 620 through resistor 636 through potentiometer 638 through diode 640 to the operational amplifier 624. The voltage at output of operational amplifier 624, as will be apparent to those skilled in the art, then begins to decrease in a ramp fashion; and the slope of the ramp may be adjusted by varying the resistance of potentiometer 638. However, momentarily after the initial decrease, the voltage at the inverting input of operational amplifier 620 becomes greater than the voltage at the noninverting input of operational amplifier 620; and the output of operational amplifier 620 again changes to the negative voltage. Again, the negative signal travels the path which includes diode 646 to the operational amplifier 624. This switching of the output of operational amplifier 620 continues as long as the transmission gate 606 acts as a closed switch and serves to maintain the fast speed output at the maximum voltage determined by potentiometer 610.

When the voltage at the control lead of transmission gate 606 then drops to a "zero" logic level, the fliers will decelerate from their maximum fast speed. Transmission gate 606 acts as an open switch, and the voltage at the inverting input of operational amplifier 620 becomes zero. Since the voltage at the inverting input has become less than the voltage at the noninverting input, the output of the operational amplifier 620 changes to the positive voltage, resulting in a decreasing voltage ramp at the output of operational amplifier 624. In this circumstance, however, the voltage decreases until the voltage at the output of operational amplifier 624, and hence the voltage at the fast speed output 662, reaches zero.

As previously described, the transmission gate 656 acts as a closed switch, discharging the capacitor 634 through resistor 654, if there are no enabling command signals at the reverse and forward slow speed inputs. This assures that the voltage ramp generated at the output of operational amplifier 624 will start from the same voltage level each time the input 402 receives an enabling signal.

Turning now to the operational amplifier 670 connected to the fast speed output 662, operational amplifier 670, as previously mentioned, also functions as a comparator. The diode 674 at the noninverting input has been chosen such that it has a 0.7 volt drop as a result of current flowing from the positive voltage source +V through resistor 672 through diode 674 to ground. When the fast speed output 662 is greater than 0.7 volt, the output of operational amplifier 670 is at −0.7 volt, near the "zero" logic level. The diode 680 has a 0.7 volt drop and thus maintains the output of operational amplifier 670 at the −0.7 volt level to protect inverter 682. The output of inverter 682 goes to a "one" logic level, which causes the output of NOR gate 684 to go to a "zero" logic level. The "zero" logic level of NOR gate 684 is inverted by inverter 686 to a "one" logic level. The current associated with the "one" logic level is, as previously mentioned, amplified by the buffer 690 and is carried through resistor 692 through resistor 694 to ground. The resulting voltage across resistor 694 causes transistor 696 to conduct, providing a short circuit from the motor contactor output 698 to ground. The grounded motor contactor output maintains the connection of the DC motor to its operating voltage.

When the fast speed output 662 drops to 0.7 volt, the output of operational amplifier 670 is at the "one" logic level; and NOR gate 684 will receive a "zero" logic level signal from inverter 682. If the other input of NOR gate 684 is also at "zero," which would result from an enabling command signal at the flier release input 404, the output of NOR gate 684 will be at a "one" logic level, which inverted to a "zero" logic level by inverter 686 and transmitted to the base of transistor 696 will cause transistor 696 to turn off, removing the ground at the emitter of transistor 696 from the motor contactor output 698, and causing the operating voltage to be disconnected from the DC motor. It can thus be seen that the operating voltage from the power supply will not be removed when the DC motor is in its fast speed operation (the servo controller receiving more than 0.7 volt at the fast speed output 662). Rather, when the flier release input 404 receives an enabling command signal, indicating that the fliers are to be released, the fast speed motor command will first go through a deceleration. When the fast speed motor command decreases to 0.7 volt, the operating voltage will then be removed.

The remaining output to be discussed is the drive disable output 702. This output is connected to the disable circuitry 119 (FIG. 1B) of the servo controller. Whenever a "zero" logic level is present at the output 702, the drive transistors 184, 158, 154 and 190 in the servo controller 125 will be turned off; and the fliers are free from control by the servo system. The drive disable output 702 receives its signal from the output of NOR gate 700. One input of NOR gate 700 is connected to the output of previously mentioned NOR gate 684, and thus the output of NOR gate 700 at output 702 will have a "zero" logic level signal present when the motor contactor output causes the power supply to be removed from the DC motor. The other input to NOR gate 700 is connected to the reverse slow speed and forward slow speed inputs by way of previously mentioned NOR gate 705. When both the reverse slow speed inputs and the forward slow speed inputs are disabled, the outputs of NAND gates 432 and 476 are at a "zero" logic level; and the output of NOR gate 705 is at a "one" logic level. This signal is inverted by inverter 706 to a "zero" logic level and delayed by the RC network comprised of the resistor 709 and capacitor 710. The "zero" logic level signal at the output of inverter 706 is inverted by inverter 712 to a "one" logic level signal. The "one" logic level signal at the output of inverter 712 is transmitted to the other input of NOR gate 700 and will cause the output of NOR gate 700, and hence the drive disable output 702, to be at a "zero" logic level. The delay imposed by resistor 709 and capacitor 710 keeps the servo system operative until it has had sufficient time to stop the servo motor and fliers through regenerative braking. Otherwise, the servo system would be disabled immediately, and regenerative braking would not be available to brake the fliers.

The diode 708 assures that the delay caused by resistor 709 and capacitor 710 will occur only when the output of inverter 706 is changing from a "one" logic level to a "zero" logic level. If the output of inverter 706 were changing from a "zero" logic level to a "one" logic level, the positive current flowing from the "one" logic level at inverter 706 would bypass resistor 709; and the signal would not be delayed by resistor 709 and capacitor 710. The delay in only one direction assures that when the appropriate command signals are received to end a disabling command at output 702, there will be no delay.

To illustrate the increased productivity resulting from winding armatures with a machine in accordance with the present invention, the following briefly describes the winding of one such armature. For purposes of example, a twelve slot armature is chosen having one coil per slot and fifty turns per coil.

In winding such an armature on the machine, it is only necessary to utilize four of the seven possible speeds, recognizing, of course, that the number of speeds required varies from armature to armature. In the present case, there would be a single reverse speed at 350 rpm, two forward slow speeds at 300 and 450 rpm, and the one fast winding speed of up to 4000 rpm. In such a case, only one of the reverse slow speed inputs—for example, the mid reverse slow speed input 410—, only two forward slow speed inputs—the fastest forward slow speed input 418 and the mid forward slow speed input 416—, and, of course, the fast speed enable input 402, would be used in the motor interface control circuitry.

The initial winding operation is a lead connection to the first pair of commutator tangs by the fliers, which can be accomplished by a forward and then reverse short stroke or movement of the fliers. A command signal will first be generated by the wind sequence control 80 to the forward slow speed input 416 of the motor interface control circuitry. A motor command will appear at the slow speed output 590 and be carried to the servo controller 125 to cause the fliers to wind at the slower of the forward slow speeds (300 rpm). After the fliers have been moved through a predetermined distance, which is reported by the position sensing mechanism 54, the flier movement is reversed by a command signal at slow speed input 410 and the resulting motor command at output 590.

It should be noted that heretofore the typical maximum speed for short stroke flier movements such as those just described was 100 rpm, which speed generally gave the maximum permissible stopping error limits of ± three degrees. In the present invention, the same error limits can be accomplished at speeds of up to 500 rpm.

After the first lead connection is completed, the next operation is the winding of the first pair of coils on the armature. To accomplish such an operation, the wind sequence control will generate command signals to the fastest forward slow speed input 418 and the fast speed input 402 of the motor. A resulting motor command appears at the fast speed output 662, the command being initially at a zero value and then increasing in a ramp fashion to a magnitude which, when added by the servo controller to the motor command at the slow speed output 590 resulting from the signal at input 418, will drive the fliers at maximum winding speed. The acceleration of the fliers from the fastest slow speed (450 rpm) to the maximum winding speed (4000 rpm) is, as mentioned earlier, determined by the slope of the ramp signal appearing at the fast speed output 662. When the winding of the first pair of coils is nearly completed, as determined by the position sensing mechanism 54 and turns counter 66, the wind sequence control removes the fast speed command signal at the input 402; and the motor command at the fast speed output 662 drops in a ramp fashion to a zero value so that the speed at which the fliers are driven by the servo system drops from the maximum winding speed to the fastest slow speed. The fliers can then be stopped by the previously discussed regenerative braking when the slow speed motor command is removed. In the present invention, the total time for decelerating (or accelerating) the fliers between the maximum and zero speeds can be less than 500 milliseconds.

The next operation is a tang connection between coils which will involve both armature rotation and a single reverse flier stroke or movement. After this tang connection is completed and the command signal at input 410 and the reverse flier movement to accomplish it ends, winding of the second pair of coils will take place with the servo controller and motor again driving the fliers from the fastest slow speed through a ramp to the maximum winding speed. The winding of each coil and the tang connection between each coil continues, as described above, until the last pair of coils is wound and the last pair of tangs receives lead connections.

It has been found that with a winding machine in accordance with the present invention, the winding of a twelve slot armature can be accomplished in approximately twenty-seven seconds. Compared to the typical period of time for winding twelve slot armatures in previous hydraulically or electrically driven machines of about thirty-six seconds, the present invention results in an increase in productivity of approximately 30%. However, even greater increases in productivity are possible, depending on the type of armature and the wire to be wound thereon. The increase in productivity resulting from a machine as described herein is quite sizable when taken over the typical eight-hour working day for a machine in which hundreds of armatures are wound. It can mean, in the present example, an increased production rate of over 250 armatures per day per machine, resulting in considerable savings in operating costs.

Although the preferred embodiment of this invention has been described, it will be understood that various changes may be made within the scope of the appended claims.

Having thus described our invention, we claim:

1. In an armature winding machine of the type having a flier for winding wire onto an armature core;
a direct current servo motor for driving said flier;

sequence control means for directing movements of said flier and generating digital command signals for each of said movements;

motor interface control means for generating motor commands in response to said command signals from said sequence control means; and means for connecting said motor to a source of direct current voltage, said connecting means including high frequency switching mode operated servo controller means for causing said source to drive said motor in response to said motor commands.

2. The armature winding machine of claim 1 wherein said motor commands include a fast speed motor command having an initial value and a maximum value and wherein said motor interface control means includes acceleration control means for changing said fast speed motor command from one of said initial and said maximum values to the other of said initial and said maximum values over a predetermined period of time.

3. The armature winding machine of claim 2 wherein said acceleration control means includes means for generating a voltage ramp and wherein said fast speed motor command is said voltage ramp.

4. The armature winding machine of claim 1 wherein said digital command signals include at least two digital command signals, and wherein said motor interface control means includes means for supplying to said servo controller means a first slow speed motor command of predetermined value for operating said motor at a first slow speed in response to one of said two digital command signals, and a second slow speed motor command of predetermined value for operating said motor at a second slow speed in response to the other of said two digital command signals.

5. The armature winding machine of claim 1 wherein said connecting means further includes motor contactor means, and wherein said motor interface control means further includes means responsive to said command signals from said sequence control means for generating a motor contactor connect signal and a motor contactor disconnect signal to said motor contactor means, said motor contactor means operable to electrically disconnect said servo motor from said source in response to said motor contactor disconnect signal and operable to connect said servo motor to said source in response to said motor contactor connect signal.

6. The armature winding machine of claim 1 wherein said servo controller means includes disable circuit means, and wherein said motor interface control means includes means for generating a drive disable signal to said disable circuit means, said disable circuit means operable upon receipt of said disable signal to disable said servo controller means so that said source is not caused to drive said motor.

7. The armature winding machine of claim 1 wherein said servo controller means includes pulse width and frequency modulation means.

8. In an armature winding machine of the type having a flier for winding wire onto an armature core;

a direct current servo motor for driving said flier;

sequence control means for directing movements of said flier and generating digital command signals for each of said movements;

motor interface control means for generating motor commands in response to said command signals from said sequence control means;

said command signals including a fast speed signal having an initial value and a maximum value, said motor interface control means including acceleration control means comprising voltage ramp generation means for changing said fast speed motor command signal from one of said initial and said maximum values to the other of said initial and said maximum values over a predetermined period of time; and means for connecting said motor to a source of direct current voltage, said connecting means including servo controller means for causing said source to drive said motor in response to said motor commands.

9. In an armature winding machine of the type having a flier for winding wire onto an armature core;

a direct current servo motor for driving said flier;

sequence control means for directing movements of said flier and generating digital command signals for each of said movements;

motor interface control means for generating motor commands in response to said command signals from said sequence control means; and means for connecting said motor to a source of direct current voltage, said connecting means including servo controller means for causing said source to drive said motor in response to said motor commands, said servo controller means including disable circuit means, and said motor interface control means including means for generating a drive disable signal to said disable circuit means, said disable circuit means being operable upon receipt of said disable signal to disable said servo controller means so that said source is not caused to drive said motor.

10. In an armature winding machine:

a flier for winding wire onto an armature core;

a direct current servo motor for driving said flier;

means for connecting said motor to a source of direct current voltage, said connecting means including high frequency switching mode operated servo controller means having a summing junction;

sequence control means for directing movements of said flier;

motor interface control means responsive to said sequence control means for supplying motor commands to said summing junction;

tachometer means driven by said motor;

means connecting an output of said tachometer means to said summing junction;

drive train means drivingly connecting said motor to said flier;

position sensor means drivingly engaged by said drive train means, said position sensor means producing an output signal indicative of the position of said flier; and means connecting said output signal to said sequence control means.

11. In an armature winding machine in which a flier winds wire onto an armature core, the combination of:

a servo motor mechanism of the type comprising a direct current servo motor for driving said flier, means including high frequency switching mode operated servo controller means for connecting a source of direct current voltage to said servo motor, said servo controller means including a preamplifier having a summing junction, tachometer means driven by said servo motor, and means connecting an output of said tachometer means to said summing junction; and sequence control means for directing movements of said flier, motor interface control means responsive to said sequence control means and including means for generating a voltage ramp motor command applied to said summing junction, drive means drivingly connecting said motor to said flier, and position sensor means drivingly engaged by said drive means and producing output signals to said sequence control means which are indicative of the position of said flier.

12. In an armature winding machine of the type having a flier for winding wire onto an armature core:

a servo system including a direct current servo motor drivingly engaging said flier and servo controller means for causing said servo motor to be driven by a source of direct current voltage;

flier release means;

sequence control means for directing movements of said flier and generating digital command signals for each of said movements, said command signals including a first digital command signal, a second digital command signal and a third digital command signal;

motor interface control means, said motor interface control means including means for generating motor commands to said servo controller in response to said command signals, said motor commands including a forward slow speed motor command in response to said first command signal for operating said flier at a slow speed in a forward direction, a reverse slow speed motor command in response to said second command signal for operating said flier at a slow speed in a reverse direction, and a fast speed motor command in response to said third command signal for operating said flier at a fast speed in said forward direction, said fast speed motor command having an initial value and a maximum value, said motor command generating means including means for generating a voltage ramp and means to adjust said voltage ramp so that said fast speed motor command may be changed from one of said initial and said maximum values to the other of said initial and said maximum values in a preselectable period of time, said voltage ramp generating means including integrator means, said motor interface control means further including means for preventing said fast speed motor command when said forward slow speed motor command is absent, comparator means for generating a motor contactor disconnect signal upon actuation of said flier release means and when said fast speed motor command is near said initial value, and means for generating a disable signal when said forward slow speed motor command and said reverse slow speed motor command are absent, said servo controller having disable circuit means for receiving said disable signal and operable to disable said servo controller means so that said servo motor is not caused to be driven by said source in response to said disable signal; and motor contactor means for receiving said motor contactor disconnect signal from said motor interface control means and operable to electrically disconnect said servo motor from said source in response to said disconnect signal.

13. The armature winding machine of claim 12 wherein said machine has two fliers, both of which are driven by said servo motor.

14. The armature winding machine of claim 1 wherein said machine has two fliers, both of which are driven by said servo motor.

15. The armature winding machine of claim 8 wherein said machine has two fliers, both of which are driven by said servo motor.

16. The armature winding machine of claim 9 wherein said machine has two fliers, both of which are driven by said servo motor.

17. The armature winding machine of claim 10 wherein said machine has two fliers, both of which are driven by said servo motor.

18. The armature winding machine of claim 11 wherein said machine has two fliers, both of which are driven by said servo motor.

* * * * *

UNITED STATES PATENT AND TRADEMARK OFFICE
CERTIFICATE OF CORRECTION

PATENT NO. : 4,163,931
DATED : August 7, 1979
INVENTOR(S) : David R. Seitz and Mark T. Heaton It is certified that error appears in the above-identified patent and that said Letters Patent are hereby corrected as shown below:

Col. 6, lines 30 and 31, "generator in relation to the magnitude of the second" should be deleted.

Col. 6, line 49, "drive" should be ---driver---.

Col. 10, line 61, "amoplifier" should be ---amplifier---.

Col. 14, line 34, "input" should be ---output---.

Signed and Sealed this

Thirtieth Day of October 1979

[SEAL]

Attest:

RUTH C. MASON
*Attesting Officer*

LUTRELLE F. PARKER
*Acting Commissioner of Patents and Trademarks*